(12) United States Patent
Hillberg et al.

(10) Patent No.: US 7,523,221 B2
(45) Date of Patent: Apr. 21, 2009

(54) MECHANISM FOR APPLYING TRANSFORMS TO MULTI-PART FILES

(75) Inventors: Michael J. Hillberg, Kirkland, WA (US); Roger Cheng, Woodinville, WA (US); David B. Ornstein, Seattle, WA (US); Jason M. Cahill, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 851 days.

(21) Appl. No.: 10/440,494

(22) Filed: May 17, 2003

(65) Prior Publication Data

US 2004/0230576 A1    Nov. 18, 2004

(51) Int. Cl.
    *G06F 15/16* (2006.01)
(52) U.S. Cl. ...................................................... 709/246
(58) Field of Classification Search ................. 709/217, 709/231, 246–247; 713/176; 715/513, 523
    See application file for complete search history.

(56) References Cited

U.S. PATENT DOCUMENTS

| | | | |
|---|---|---|---|
| 6,357,042 B2 | 3/2002 | Srinivasan et al. | 725/32 |
| 6,529,948 B1 | 3/2003 | Bowman-Amuah | 709/217 |
| 6,584,480 B1 * | 6/2003 | Ferrel et al. | 715/513 |
| 6,796,489 B2 * | 9/2004 | Slater et al. | 235/379 |
| 6,981,141 B1 * | 12/2005 | Mahne et al. | 713/165 |
| 6,990,585 B2 * | 1/2006 | Maruyama et al. | 713/176 |
| 2002/0003886 A1 * | 1/2002 | Hillegass et al. | 380/282 |
| 2003/0146857 A9 * | 8/2003 | Koike | 341/55 |
| 2004/0220895 A1 * | 11/2004 | Carus et al. | 707/1 |

\* cited by examiner

*Primary Examiner*—Salad Abdullahi
(74) *Attorney, Agent, or Firm*—Merchant & Gould, P.C.

(57) ABSTRACT

Described is a system and method for applying transforms to multi-part files. A request is received to access a stream within a multi-part file. Upon receipt of the request, a list of transforms associated with the stream is identified. The list is also included within the multi-part file. The transforms specified in the list of transforms are performed on data before completing the request. If the request is a write, the transforms encode the data. If the request is a read, the transforms decode the data. The list of transforms is order dependent. The list of transforms includes a data structure having a first stream that includes a map that correlates the stream with a name for the list of transforms. A second stream that lists each of the transforms for the stream. A third stream for each of the transforms listed that identifies information associated with the transform.

27 Claims, 5 Drawing Sheets

MECHANISM FOR APPLYING TRANSFORMS TO MULTI-PART FILES

BACKGROUND OF THE INVENTION

Computer systems today typically store a large amount of data in several files. The format for the files may be one of several different formats that are compatible with various applications, such as word processors, spreadsheets, and the like. Many times it is necessary to transmit a file to another computer so that another user may see or manipulate the data within the file. Sometimes, when the file is quite large, a transformation (e.g., compression) is performed on the file before sending the file to the other computer. By compressing the file, less bandwidth is needed to send the data to the other computer. In other situations, another transformation (e.g., encryption) may be performed to protect the data from being seen by unauthorized users.

Some of these transformations have specific encoding methods and use a separate file (e.g., dictionary) to store information about the specific encoding method. The separate file must be used when accessing the transformed file. If the separate file becomes corrupted, lost, or otherwise unavailable, the transformed file becomes useless. In addition, because some of these transformations define their own specific encoding methods for interleaving encoded data and processing information, once the file is transformed, the file can not be shared or have common processing performed on it. In addition, before transforming a file, current transformations require that the data within the file to be arranged in contiguous bytes. Ensuring that the bytes for the file remain contiguous consumes a lot of overhead and is not viable for files that are edited quite often. Thus, while these transformations are very useful, the way in which they are implemented do not offer a versatile experience to users.

SUMMARY OF THE INVENTION

The present invention is directed at a system and method for implementing transformations that provide greater flexibility to users. Briefly stated, the present invention provides a mechanism for storing transformation information associated with one or more transformations within a multi-part file. The multi-part file also contains the data upon which the one or more transformations are applied. Thus, the present invention provides a file format for the multi-part file so that applications accessing the data may easily access the transformed data. In accordance with the invention, multiple data transforms may be chained together. These chained data transforms are referred to as a "data spaces". Each data space has a unique order and type for the transforms that are chained together. For example, two data spaces may specify the same transforms, but specify a different order for applying the transforms. The transformation information contains information about the data spaces.

In accordance with another aspect of the invention, the multi-part file contains a plurality of streams. Each stream may be associated with one of the data spaces. Thus, in accordance with the present invention some streams within the multi-part file may be transformed while other streams may remain in their native format. This ability to transform specific streams without requiring transformation of the entire multi-part file offers great flexibility to users, such as allowing the user to encrypt only the sensitive information within the multi-part file (e.g., redacting documents).

Thus, the present invention is directed at a system and method for applying transforms to multi-part files. A request is received to access a stream within a multi-part file. Upon receipt of the request, a list of transforms associated with the stream is identified. The list is also included within the multi-part file. The transforms specified in the list of transforms are performed on data before completing the request. If the request is a write, the transforms encode the data. If the request is a read, the transforms decode the data. The list of transforms is order dependent. The list of transforms includes a data structure having a first stream that includes a map that correlates the stream with a name for the list of transforms. A second stream that lists each of the transforms for the stream. A third stream for each of the transforms listed that identifies information associated with the transform.

DETAILED DESCRIPTION OF THE PREFERRED EMBODIMENT

The invention provides a mechanism for applying transforms to multi-part files. The mechanism provides a structure for specifying transformation information. The transformation information and the transformed data co-exist within the same document. The mechanism of the invention is preferably based on a multi-part file format that allows multiple types of streams within one document. The inventors have determined that the Object Linking and Embedding (OLE) compound file format is especially well suited to implementations of the invention. Thus, the following discussion describes the invention using the compound file format. However, those skilled in the art, after a careful reading of the following description, will recognize that other multi-file formats may implement the present invention with various modifications to the mechanism described below to accommodate the other multi-file formats. Thus, it will be appreciated that embodiments of the invention are not limited to those described here.

The invention will be described here first with reference to one example of an illustrative computing environment in which embodiments of the invention can be implemented. Next, a detailed example of one specific implementation of the invention will be described. Alternative implementations may also be included with respect to certain details of the specific implementation.

Illustrative Computing Environment of the Invention

Figure 1:
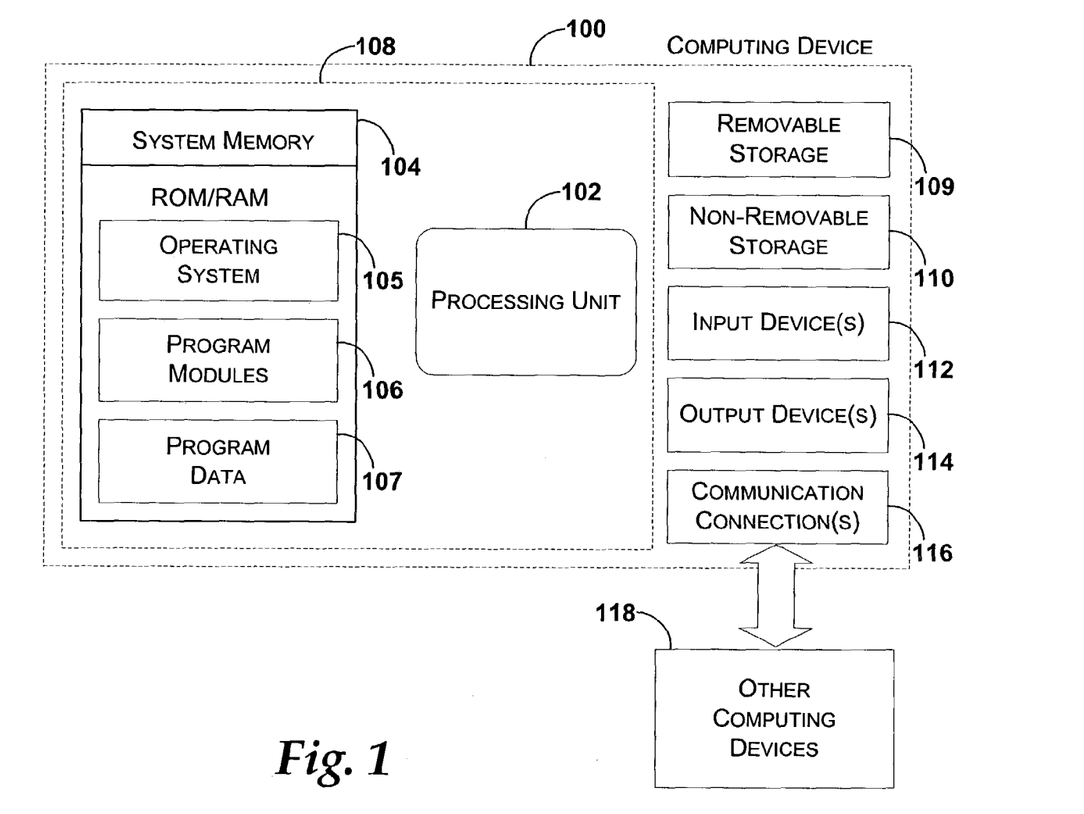
FIG. 1 is a functional block diagram that illustrates a computing device that may be used in implementations of the present invention.

FIG. 1 is a functional block diagram that illustrates a computing device that may be used in implementations of the present invention. FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

General Discussion of Components

Figure 2:
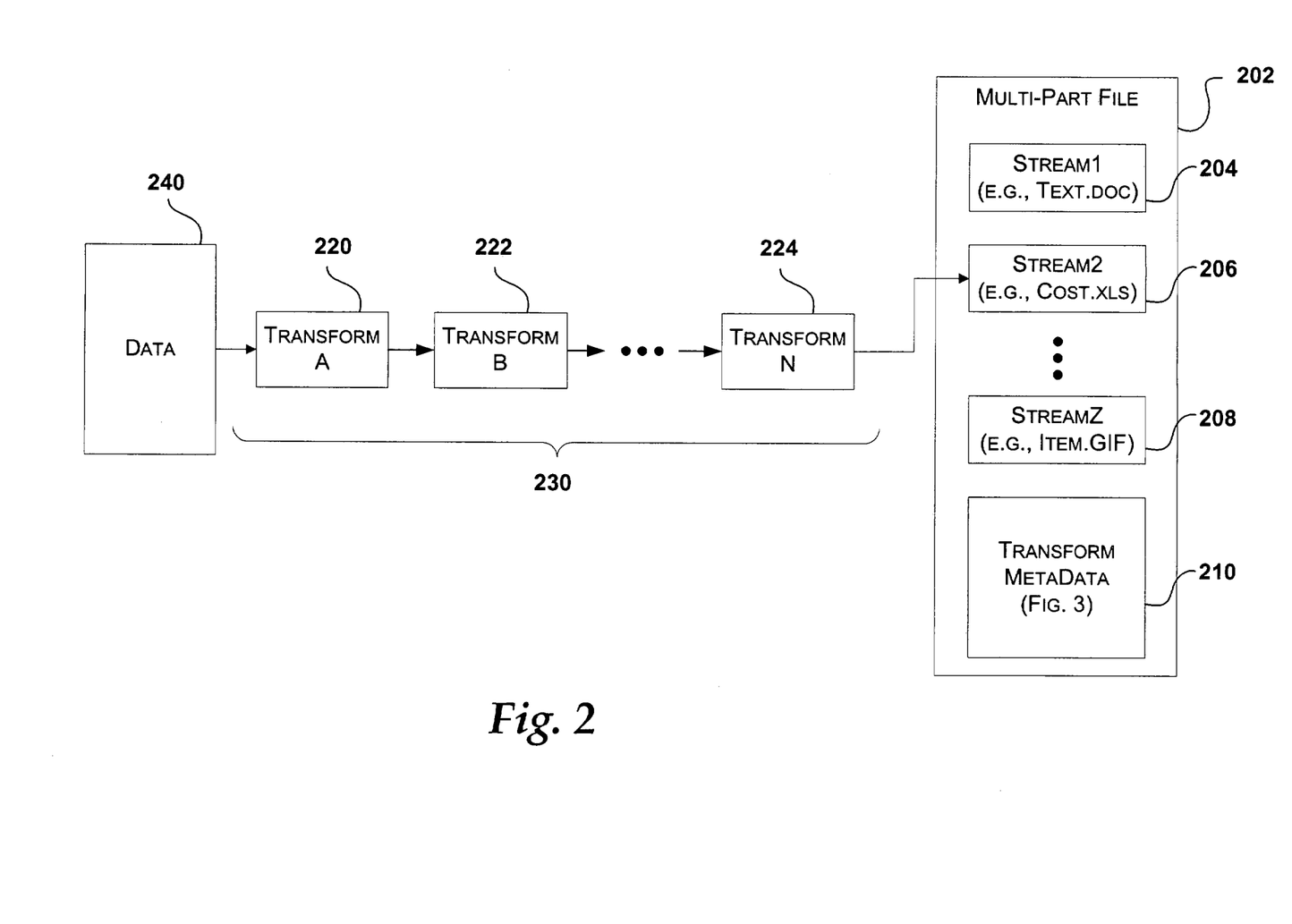
FIG. 2 is a functional flow diagram generally illustrating an overview of a transformation process in accordance with the present invention.

FIG. 2 is a functional flow diagram generally illustrating an overview of components of an environment implementing the present invention. Illustrated is a multi-part file 202, preferably an OLE compound file. The OLE document model is known in the art and is widely recognized as a mechanism for containing many disparate types of data within a single document. Conventionally, the OLE compound file is used in conjunction with having several embedded files or other support content associated with a single document. Each element in the compound file is stored in a manner such that it can be manipulated by the application that created the element. Each element is stored as a stream, such as streams 204, 206, and 208 shown in FIG. 2. As mentioned above, each stream may be one of several types. For instance, stream1 204 may be a word processing document, stream2 206 may be a spreadsheet, and streamZ 208 may be a graphics file.

In the past, upon requesting a transformation on the multipart file 202, the entire content of multi-part file 202 (i.e., streams 204-208) would have been required to be contiguous and would have been transformed together. However, in accordance with the present invention, the streams 204-208 need not be contiguous. Rather, the streams 204-208 may be sector-based. For the following discussion, sector-based files refer to files having multiple chunks of data that are stored and that represent the entire stream. The multiple chunks may be stored contiguously, but typically are stored non-contiguously. In one embodiment, the chunks may be fixed size, such a fixed at 512 bytes. Alternatively, the chunks may be variably sized without departing from the scope of the present invention. When the stream is edited, a new chunk of data may be created and stored in non-contiguous bytes in relations to the other chunks of data for the stream. Thus, sector-based files allow for easy editing of the stream without the overhead of ensuring that the stream remains contiguous.

As will be described in detail below, the present invention allows specified chunks of data 240 associated with a stream (e.g., stream 206) within the multi-part file 202 to be transformed without transforming other streams. Because the present invention allows specified streams to be transformed independent of other streams, the invention provides a great flexibility for securing and controlling data. For example, FIG. 2 illustrates stream2 206 undergoing a transformation process. Stream2 206 may represents a spreadsheet containing the costs associated with a particular item. Therefore, it may be desirable to secure this cost information so that unauthorized users can not view the costs. Thus, the data 240 destined for stream2 206 undergoes a chain of transforms (i.e., transforms 220-224). As one skilled in the art will appreciate, any number of transforms may be chained and may be chained in any order. The specific transforms that are chained and the order in which the transforms are chained represent a data space 230. In general, a data space may specify one transform or may specify multiple transforms. In the above example, the last transform (e.g., transform 224) writes the transformed data to the stream2 206, which may reside on a disk (not shown). One embodiment for using the mechanism for applying transforms to multi-part files is described in detail in conjunction with FIG. 4 below.

Discussion of a Particular Embodiment of the Invention

Figure 3:
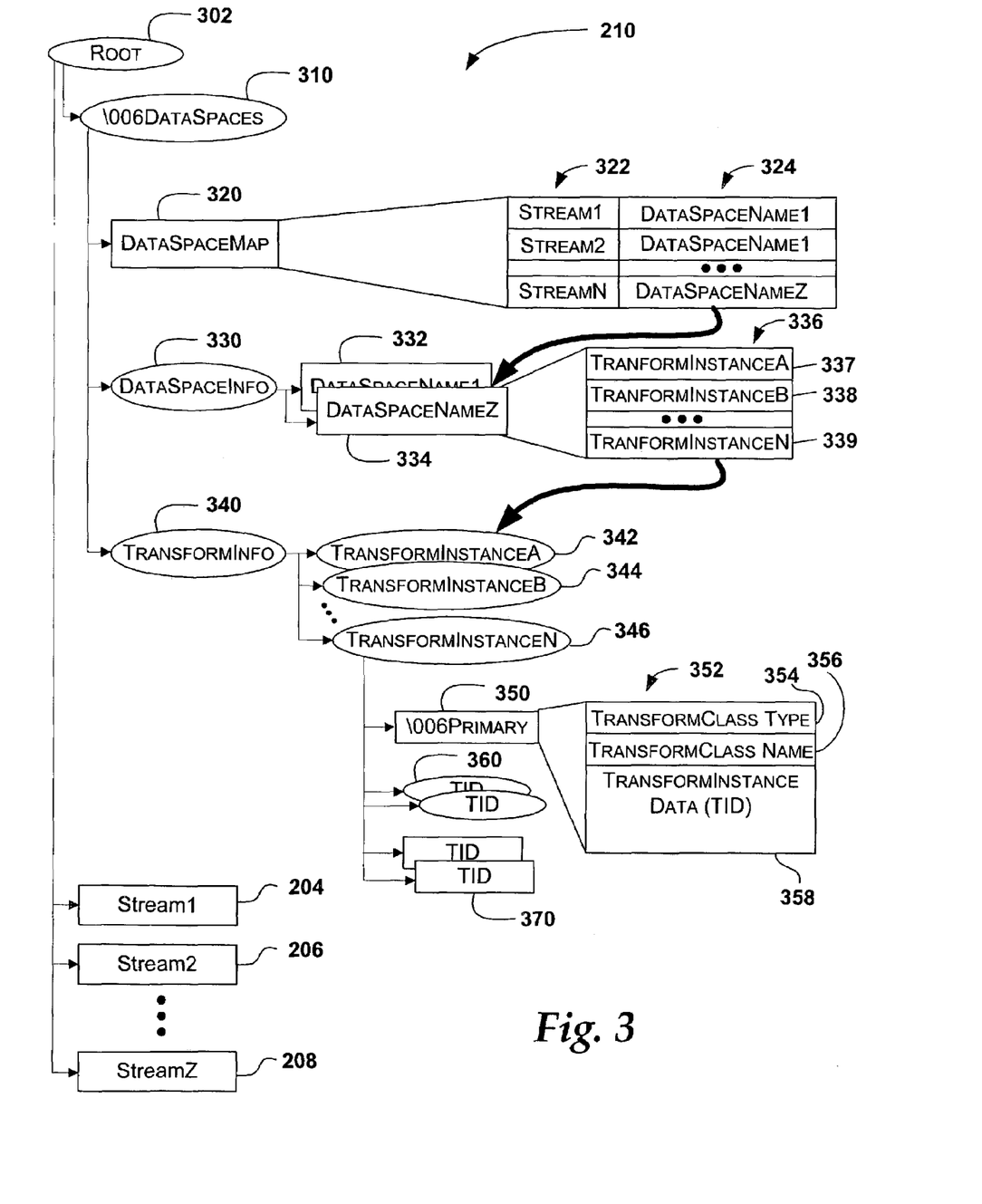
FIG. 3 is a graphical representation of an exemplary tree hierarchy that represents the transform metadata shown in FIG. 2.

FIG. 3 is a graphical representation of one embodiment of a tree hierarchy that represents the transform metadata 210 shown in FIG. 2. In general, the tree hierarchy may be included within the multi-part file in any manner compatible with the multi-part file. The following discussion, describes the tree hierarchy with reference to compound files. In overview, compound files are commonly considered as a "file system within a file." Within the compound file is a hierarchy of "storages," which are analogous to directories in a file system, and "streams," which are analogous to files in a file system. For FIG. 3, rectangular boxes represent the streams and ovals represent the storage. Before describing the transform metadata 210 of the present invention, one will note that the streams 204-208 (shown in FIG. 2) are illustrated under the root 302 in this example hierarchy. Defining streams under the root is a common technique for compound file formats.

The transform metadata 210 provided by the present invention is now discussed in further detail. A special storage, named "\006DataSpaces" 310 off the root 302 stores the transform metadata 210. The \006DataSpace storage 310 contains a DataSpaceMap stream 320, a DataSpaceInfo storage 330, and a TransformInfo storage 340. For this embodiment, the name chosen for the special storage, "\006DataSpaces", is written in context of the C Programming language. Thus, in this embodiment, the name begins with a single non-alphanumeric token and a token value of 6. In general, the name assigned to the special storage is arbitrary and depends on the user's implementation.

The DataSpaceMap stream 320 maps the streams (e.g., streams 204-208) with their associated data space. In one embodiment, the DataSpaceMap stream 320 is a table having two columns: a stream reference column 322 and a DataSpaceName column 324. The contents within the stream reference column 322 refer to one of the streams (e.g., streams 204-208) stored within the compound document. The contents within the DataSpaceName refer to a specific data space that has been defined for the associated stream identified within the stream reference column 322. One data space may be associated with any number of streams. For example, as shown in FIG. 3, the data space identified as "DataSpaceName1" is associated with Stream1 204 and Stream2 206. While the above description of the DataSpaceMap stream 320 describes the DataSpaceMap stream 320 as a table, those skilled in the art will appreciated that other data formats may also be used to identify and correlate the stream with a data space.

The DataSpaceInfo storage 330 contains one or more DataSpaceName streams (e.g., DataSpaceName stream 332 and 334). For the described embodiment, the DataSpaceName stream is named in accordance with standard, compound-file short name conventions. Each DataSpaceName stream 332 and 334 identifies a list 336 of transforms associated with the respective DataSpaceName stream 332 and 334. In one embodiment, each of the DataSpaceName streams 332 and 334 may be an ordered list of the transforms that make up the data space. Because transforms stack, the order within the list 336 is important. In one embodiment, the first transform 337 within the list 336 is referred to as the "bottom" transform, which means the transform 337 is closest to the bits in the underlying data stream (e.g., stream 204). The last transform 339 within the list 336 is referred to as the "top" transform, which means the transform 339 is the closest to the consumer/producer of the data (e.g., an application). As will be described in detail below in conjunction with FIG. 4, the order specified in the list 336 determines the flow of data through the transforms.

The TransformInfo storage 340 contains one or more TransformInstance storages (e.g., TransformInstance storage 342, 344, and 346). In one embodiment, the names of these substorages are the names of the transforms. Within each of the TransformInstance storages 342, 344, and 346, there is at least one stream named "\006Primary" 350. The \006Primary stream 350 contains pertinent information about the specific transform, such as TransformClass Type 354 and TransformClass Name 356. The TransformClass Type 354 denotes a particular transform class that implements a particular transform (e.g., LZ compression, Digital Rights Management (DRM) protection, and the like). In one embodiment, the TransformClass Name 356 is specified as a string that uniquely identifies the class (i.e., type) of the transform. The string that identifies the class may be a class name for the class that implements the transform. The TransformClass Type 354 specifies a type indicator that tells how to interpret the string specified in the TransformClass Name 356. The \006Primary stream 350 may also contain space for TransformInstance Data 358. The TransformInstanceData 358 stores information specified to the transform specified by the TransformClass Name 356 and TransformClass Type 354. For example, if the transform is a compression transform, the TransformInstanceData 358 may contain a window size and the like.

For certain transforms, the TransformInstanceData 358 may not allow sufficient space to store the necessary information. Thus, as a further refinement, the present invention allows transforms to store additional information in a TransformInstanceData stream (e.g., TransformInstanceData stream 370). This is allowed as long as there are no name collisions with the \006Primary stream 350. The nature of the TransformInstanceData will vary depending on the type of transform.

Figure 4:
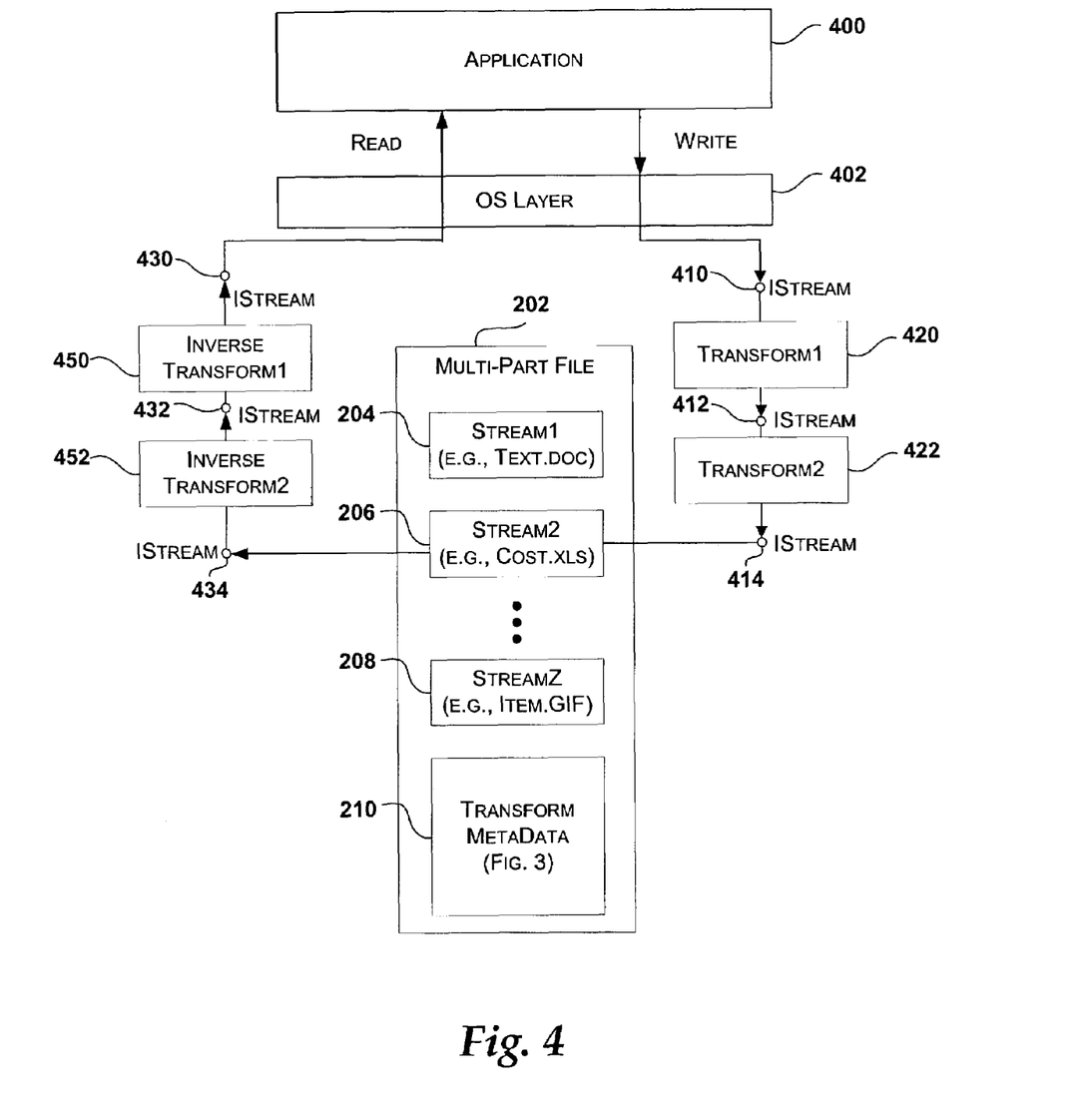
FIG. 4 is a graphical depiction of the transformation process.

While the above tree hierarchy describes one embodiment of a document format for storing transformed data with its transformation information, those skilled in the art will appreciate that the hierarchy may be changed without impacting the operation of the present invention. Therefore, any tree hierarchy in which transformation information is stored along with the transformed data does not depart from the present invention. FIG. 4 is a graphical depiction of the transformation process in which the mechanism for formatting documents having transformed data in accordance with the present invention is used. In this illustrative transformation process, an application 400 attempts to read and write to the multi-part file 202 described in FIG. 2. In general, each instance of a transform class takes an IStream interface as input, and outputs the encoded (i.e., transformed) data to another IStream interface. The transforms (e.g., transforms 420 and 422) have been registered and the data space associated with stream 206 as already been specified, such as via application programming interfaces provided by OLE compound documents. For example, when stream 206 was first created, the application that created the stream 206 within multi-part document 202 was responsible for specifying which transforms to apply to the data. This may have occurred via an argument list, where each argument referred to a transform.

The read and write access is via an OS layer. In the past, a write operation would have accessed stream2 206 via IStream interface 414. However, in accordance with the present invention, one or more transforms may be inserted before the IStream interface 414. Each transform (e.g., transform 420 and 422) takes an IStream interface as input (IStream interface 410 and 412, respectively), and output their encoded (i.e., transformed) data to another IStream interface (IStream interface 412 and 414, respectively).

Likewise, when application 400 attempts to read stream2 206 within multi-part file 202, one or more inverse transforms (e.g., inverse transforms 450 and 452) may be inserted. The number of inverse transforms is identical to the number of transforms in order for the data to be properly decoded so that the application can understand the data. The manner in which the transforms are inserted between the application 400 and the stream 206 is now described in conjunction with FIG. 5.

Figure 5:
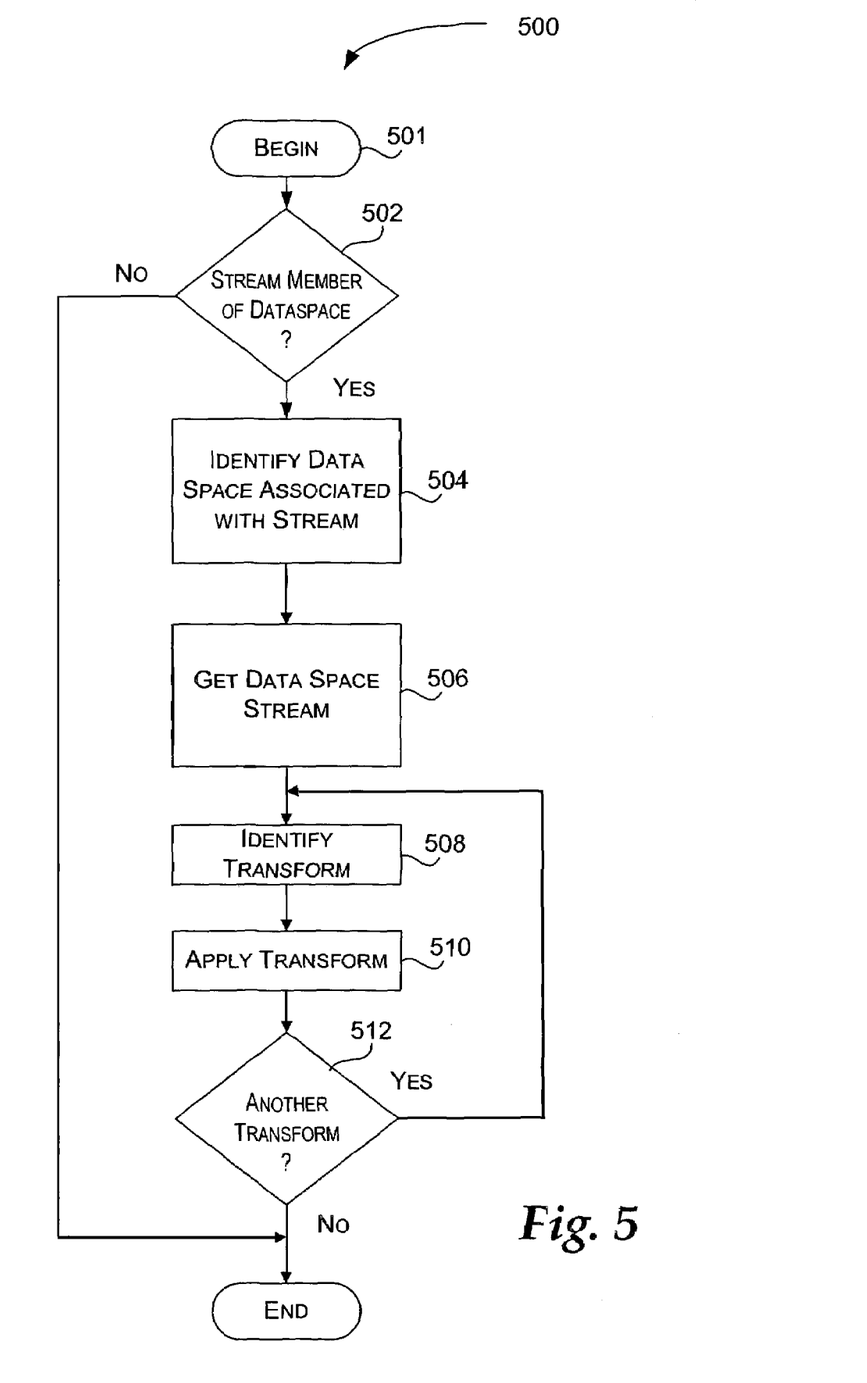
FIG. 5 is a logical flow diagram generally illustrating a process for accessing transformed data within a multi-part file, in accordance with one embodiment of the invention.

FIG. 5 is a logical flow diagram generally illustrating a process for accessing transformed data within a compound file, in accordance with the invention. The process 500 begins at a starting block 501 where an application has requested an access to data within in stream of a multi-part file. The transform information 210 has already been specified for the stream.

At decision block, a determination is made whether the stream is a member of a data space. Referring to FIG. 3, for one embodiment, this determination is made by searching within the DataSpaceMap for the stream reference 322 that identifies the requested stream. If the stream reference 322 associated with the stream is not found, the stream does not have any transforms defined and processing proceeds to the end. In this situation, the application accesses the data in the way in which it was done before the present invention. However, if the stream reference 322 is contained within the DataSpaceMap, processing continues at block 504.

At block 504, the DataSpaceName associated with the stream reference 322 is obtained. The DataSpaceName may be a string or any other format.

At block 506, using the DataSpaceName obtained from block 504, the DataSpaceInfo storage is searched to identify the DataSpaceName stream associated with the DataSpaceName identified within the DataSpaceMap. The DataSpaceName stream contains a list of transforms associated with this data space name.

At block 508, a transform from within the list is identified. Depending on whether the access is a write or a read, the transform may encode the data or may decode the data, respectively. The DataSpaceName stream lists each transform in a specific order. If the access is a write, the order is from top to bottom. If the access is a read, the order is from bottom to top.

At block 510, the identified transform is applied. When applying the transform, the transform instance data is used to properly transform the data. If the access is a write, the transform (encode) is applied. If the access is a read, the inverse transform (decode) is applied.

At decision block 512, a determination is made whether the data space includes any further chained transforms. This may be determined by seeing whether list 336 references any more transform instances. If the last transform in the data space has been applied, the last transform outputs the data and the process is complete. However, if there is another transform listed, processing loops back to block 508 and proceeds as described above until the last transform has been applied.

In addition, one skilled in the art will appreciate that the functionality provided by process 300 may be implemented in various ways. For example, there may be a mapping directly from the stream name to a transform list (skipping the use of a data space). Thus, the present invention includes this and other embodiments for mapping the stream to its transform information. Process 500 illustrates one such embodiment.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method, comprising:
    receiving a request to access a stream within a multi-part file; wherein the multi-part file includes streams,-data spaces and transformation instances; wherein each stream is associated with a data space; wherein each data space is associated with a list of transformation instances; and wherein each transformation instance includes a description of a transformation to be applied in a specific order to data within a stream;
    identifying a data space that is associated with the stream, the data space being identified from within the multi-part file; and
    performing the transforms in the order specified in the list of transforms on data before completing the request.

2. The computer-implemented method of claim 1, wherein the multi-part file includes an OLE compound file.

3. The computer-implemented method of claim 1, wherein identifying the data space comprises searching a data space map for the stream, the data space map providing a correlation between the stream and a data space name associated with the data space.

4. The computer-implemented method of claim 1, wherein the list includes a type and a name for each transform listed.

5. The computer-implemented method of claim 1, wherein the list further includes transform instance data for one of the transforms identified in the list, the transform instance data specifies pertinent information for decoding data transformed by the one transform.

6. The computer-implemented method of claim 1, wherein the request is a write request of a data chunk and the at least one transform is performed on the data chunk to create encoded data that is written to a storage medium.

7. The computer-implemented method of claim 6, wherein the data chunk is not contiguous with other data chunks previously written to the storage medium for the stream.

8. The computer-implemented method of claim 6, wherein the data chunk is a fixed size chunk with other data chunks for the stream.

9. The computer-implemented method of claim 1, wherein the list includes a compression transform and an encryption transform.

10. The computer-implemented method of claim 1, wherein the request is a read request of a data chunk and the at least one transform performs an inverse transform on the data chunk retrieved from the stream to provide decoded data to the requestor.

11. A computer system having a mechanism for applying transforms to multi-part files, the computer system comprising:
    a processor; and
    a memory, the memory being allocated for a plurality of computer-executable instructions which are loaded into the memory for execution by the processor, the computer-executable instructions performing a method comprising:
    receiving a request to access a stream within a multi-part file; wherein the multi-part file includes streams and data spaces; wherein each data space specifies a list of transforms to be applied in a specific order to data within a stream;
    identifying the list of transforms associated with the stream in response to the data space specification of the list of transformations, the list being identified from within the multi-part file; and
    performing the transforms in the order specified in the list of transforms on data before completing the request.

12. The computer system of claim 11, wherein the multi-part file includes an OLE compound file.

13. The computer system of claim 11, wherein identifying the list of transforms comprises searching a data space map for the stream, the data space map providing a correlation between the stream and a data space name associated with the data space.

14. The computer system of claim 11, wherein the list of transforms includes a type and a name for each transform listed.

15. The computer system of claim 11, wherein the list further includes transform instance data for one of the transforms identified in the list, the transform instance data specifies pertinent information for decoding data transformed by the one transform.

16. The computer system of claim 11, wherein the request is a write request of a data chunk and the at least one transform is performed on the data chunk to create encoded data that is written to a storage medium.

17. The computer system of claim 16, wherein the data chunk is not contiguous with other data chunks previously written to the storage medium for the stream.

18. The computer system of claim 16, wherein the data chunk is a fixed size chunk with other data chunks for the stream.

19. The computer system of claim 11, wherein the list includes a compression transform and an encryption transform.

20. The computer system of claim 11, wherein the request is a read request of a data chunk and the at least one transform performs an inverse transform on the data chunk retrieved from the stream to provide decoded data to the requestor.

21. A computer-readable storage medium encoded with a data structure, comprising:
- a first stream included within a multipart file, wherein the first stream includes a map that correlates a stream within the multi-part file with a name for a data space that specifies a list of transforms to be applied in a particular order to the stream within the multipart file;
- a second stream included within the multipart file, wherein the second stream describes the data space by listing each of the transforms included within the data space in the particular order that they are to be applied to the stream; and
- a third stream, included within the multipart file, for each of the transforms, wherein the third stream identifies information that describes the transformations to be applied to streams associated with the transform.

22. The computer-readable storage medium of claim 21, wherein the data structure is included within the multi-part file.

23. The computer-readable storage medium of claim 21, wherein the name for the list of transforms may be correlated with multiple streams within the multi-part file.

24. The computer-readable storage medium of claim 21, wherein the list of transforms is order dependent.

25. The computer-readable storage medium of claim 21, wherein the information identifies a class name and a class type for the transform.

26. The computer-readable storage medium of claim 25, wherein the information further identifies instance data associated with the transform.

27. The computer-readable storage medium of claim 26, wherein the transform includes a compression transform and the instance data includes a window size for the compression transform.

* * * * *